United States Patent [19]

Mauz et al.

[11] Patent Number: 4,959,982
[45] Date of Patent: Oct. 2, 1990

[54] INTERLOCK DEVICE BETWEEN AN IGNITION LOCK AND A MANUAL SELECTOR LEVER FOR AN AUTOMATIC GEAR-CHANGE TRANSMISSION

[75] Inventors: Lothar Mauz, Esslingen; Harald Gellner, Marbach, both of Fed. Rep. of Germany

[73] Assignee: Daimler-Benz AG, Stuttgart, Fed. Rep. of Germany

[21] Appl. No.: 430,639

[22] Filed: Oct. 31, 1989

[30] Foreign Application Priority Data

Dec. 16, 1988 [DE] Fed. Rep. of Germany ....... 3842332

[51] Int. Cl.$^5$ .............................................. E05B 25/12
[52] U.S. Cl. ........................................ 70/248; 74/850; 70/239; 70/252
[58] Field of Search ................. 70/248, 247, 237, 238, 70/239, 252; 74/850, 473 R

[56] References Cited

U.S. PATENT DOCUMENTS 3,765,262 10/1973 Mendenhall ...................... 74/473 R
4,520,640 6/1985 Kramer ................................. 70/248
4,671,085 6/1987 Yamaguchi ........................... 70/248
4,724,722 2/1988 Beauch .................................. 74/850
4,821,605 4/1989 Dzioba .................................. 74/850
4,854,193 8/1989 Neuman ................................ 74/850

Primary Examiner—Robert L. Wolfe
Attorney, Agent, or Firm—Evenson, Wands, Edwards, Lenahan & McKeown

[57] ABSTRACT

Interlock device between an ignition lock and a manual selector lever of an automatic gear-change transmission has a first latch element interacting with the ignition lock and a second latch element interacting with the manual selector lever. The two latch elements are connected by means of a flexible adjusting linkage for transmitting tensile and compressive forces so that only in the parking position of the manual selector lever is the ignition lock actuable into its position of rest which solely allows the ignition key to be removed and wherein the manual selector lever is blocked in its parking position when the ignition lock is in the position of the rest.

20 Claims, 2 Drawing Sheets

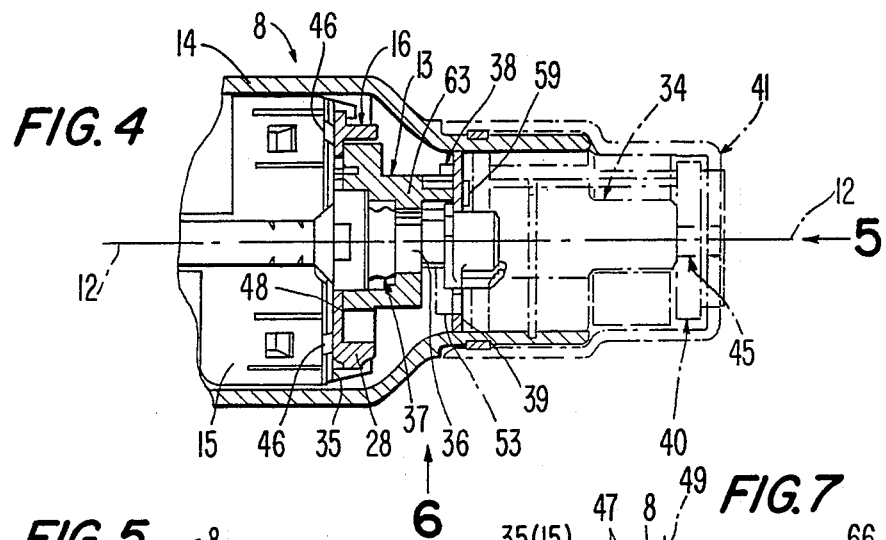
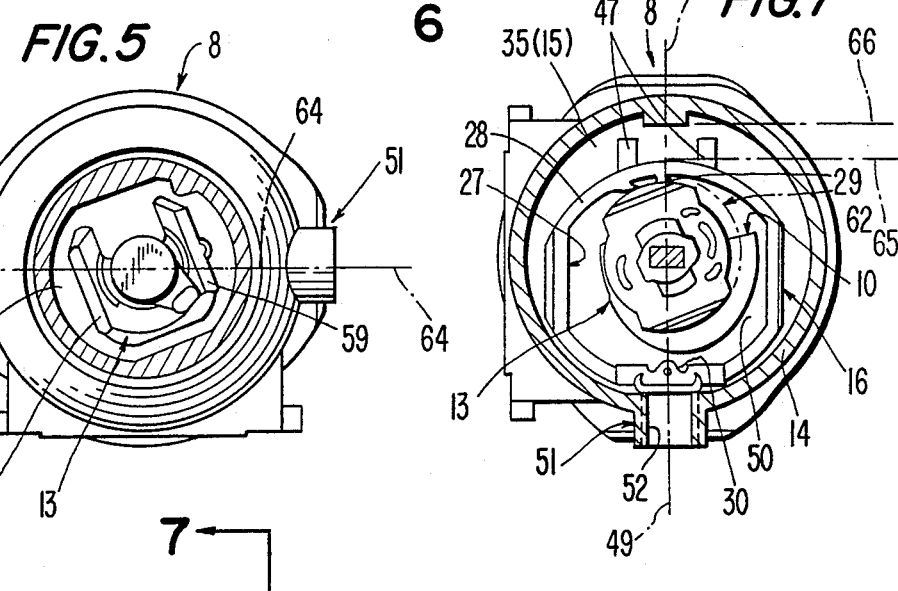
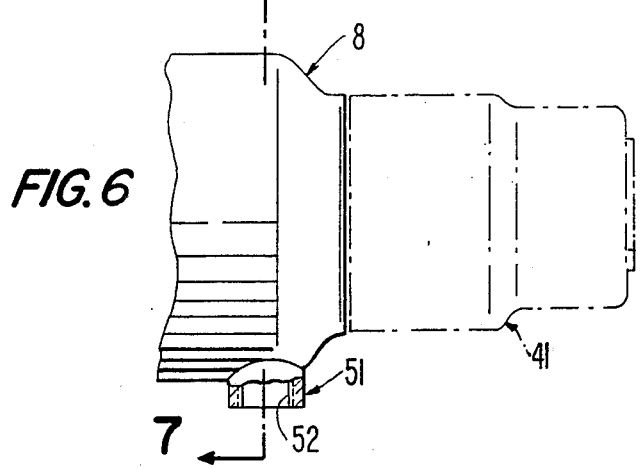

INTERLOCK DEVICE BETWEEN AN IGNITION LOCK AND A MANUAL SELECTOR LEVER FOR AN AUTOMATIC GEAR-CHANGE TRANSMISSION

BACKGROUND AND SUMMARY OF THE INVENTION

The invention relates to an interlock device between an ignition key lock and a manual selector lever of an automatic gear-change transmission, in which a detent cam of a camshaft part is rotatable by an ignition key acting counter to a resilient bias and mounted in alignment with and rotatable relative to the axis of rotation of the ignition key lock. The detent cam interacts with a first latch element which is displacably arranged on a housing part, fixed in terms of movement relative to the ignition key lock housing, and is connected kinematically to a rod end of a mechanical adjusting linkage. Another rod end of the linkage is connected kinematically to a further latch element pivotably mounted, on a housing part fixed to the vehicle in the vicinity of the manual selector lever. The other end acts with a second detent cam, (moveable by the selection of movements of the manual selector lever) through counterdetent means. When the manual selector lever is actuable into a parking position and the ignition lock is brought into a one set rotary angle position (position of rest), the ignition key can be inserted and withdrawn from the ignition key lock lock. The mutual relationship of the two detent cams and latch elements is such that only in the parking position of the manual selector lever can the ignition key lock be brought into the position of rest and in that position of rest, the manual selector lever is necessarily locked in its parking position. The second detent cam of the manual selector lever is uncoupled from the counterdetent means of the further pivotable latch element when the manual selector lever is not in the parking position. Second resilient means, supported relative to the housing, act with an uncoupling effect to disengage the second pivotable latch element from the second detent means.

An interlock device of this general type is known from German Offenlegungsschrift No. 3,425,189. There an additional flat intermediate slide is mounted in the steering-column lock housing so as to be displacable between two end positions and in a plane perpendicular relative to the axis of rotation of the ignition lock. The slide is actuable into one end position by a detent cam of a camshaft part arranged in alignment with and rotatively fixed relative to a lock-cylinder core when an orifice of a displacable latch element, connected to a linkage, is brought in alignment with the path of movement of a detent pin of the intermediate slide. This occurs in the parking position of the manual selector lever, so that the detent pin can then enter the orifice and the intermediate slide can assume the respective end position, in which the camshaft part is brought into its rotary angle position corresponding to the position of rest of the ignition lock. Then the ignition key can be removed. When the ignition lock is re-actuated into the driving position, the intermediate slide is actuated into the other end position by resilient means and it penetrates into a circumferential groove of the camshaft part and in an end position rests against the groove bottom. In this end position, the detent pin of the intermediate slide has come out of the orifice of the displacable latch element, so that the manual selector lever is now actuable out of the parking position, which hitherto now has been blocked by the detent pin into its other selection positions. In these other positions, an actuation of the ignition key into the position of rest is blocked because the orifice of the displacable latch element no longer coincides with the detent pin of the intermediate slide and hence the latter is fixed essentially immovably in its end position on the groove bottom of the camshaft part.

In this known interlock device, there is the danger as a result of a breakage of the mechanical adjusting linkage, that the position of rest of the ignition lock will be blocked and therefore it will no longer be possible to remove the ignition key and consequently stop the engine. The reason for this is that it is not possible to actuate the mechanical adjusting linkage from the camshaft part, i.e. by means of the ignition key. Here the intermediate slide is constantly actuated by one resilient means with the effect of blocking of the position of rest and the displacable latch element is actuated by the other resilient means with a blocking effect for the intermediate slide.

An interlock device of a different type between an ignition lock and a steering shaft and using a two-part longitudinal displacable detent latch, is known from European Patent Specification No. 0,082,323. One part of the detent latch is made bolt-shaped and is engagable into a corresponding recess of the steering shaft. The orifice of the other detent-latch part is designed as a frame-shaped slide and has a camshaft part arranged both in alignment with and rotational fixedly relative to the lock-cylinder core of the ignition lock and passing through it. Nevertheless, this camshaft part does not interact with its detent cam directly, but rather, via a second frame-shaped slide on a detent latch, which is actuable by a resilient means supported on the housing, into the detent position blocking the steering shaft.

The object on which the instant invention is based is to essentially provide an interlock device that will avoid the danger that, a position of rest of the ignition lock will be blocked as a result of breakage of the mechanical adjusting linkage and thus the ignition cannot be turned off.

According to the invention, the object is achieved in an advantageous way by having a camshaft part with its axis of rotation aligned with an orifice of a frame-shaped slide of a displacable latch element and wherein an additional control cam can be brought into engagement via its detent cam with a counterdetent cam and via its control cam with a counter control cam. The counterdetent cam and counter control cam are arranged to extend radially relative to the axis of rotation of the camshaft part and at points of the slide located diametrically opposite one another in relation to the camshaft part. In this way the counterdetent cam is located at a differential angle of rotation in front of the rotary angle position, corresponding to the position of rest of the detent cam of the camshaft part. The counter detent cam can be brought out of engagement with the detent cam of the camshaft part by resilient means counteracting the actuation by the ignition key. This resilient means is designed with a higher spring force than a resilient means acting on the pivotable latch element associated with the annular selection lever and with the effect of uncoupling the detent cam from the manual selector lever. During actuation into the rotary angle position, corresponding to the driving position of the ignition lock, the control cam of the camshaft part comes into engagement with the counter control cam in such a way that the counterdetent cam of the slide is located in the path of movement of the detent cam of the camshaft part and the pivotable latch element is uncoupled from the detent cam of the manual selector lever.

In the interlock device according to the invention, the detent cam of the camshaft part and the associated counterdetent cam of the frame-shaped slide are necessarily brought out of engagement by the respective resilient means, should the mechanical adjusting linkage be broken such as might occur in the event of an accident.

According to the invention, there is advantageously no need for the intermediate slide necessary in the known interlock device.

In the known interlock devices, when the parking position is assumed, the bolt-shaped detent cam of the manual selector lever enters a fork-shaped counterdetent member on the pivotable latch element, which is actuable into one of two end positions by means of a torsion spring supported on the housing. In this first end position, the fork-shaped counterdetent member is open towards a notch orifice of a notch plate fixed relative to the housing, for the engagement of the positions of the selector lever. When the gear selection lever leaves the parking position, the detent cam (belonging to the manual selector lever and also used as a resilient counter notch) can come out of the fork-shaped counterdetent member and change over to that region of the notch orifice not coinciding with the counterdetent member. When the parking position is selected, the pivotable latch element is actuated by the detent cam into its other end position, in which the fork-shaped counterdetent member coincides with the notch associated with the parking position and is closed off from the remaining part of the notch orifice by one of its fork arms.

In this known interlock device, there is the danger that after a breakage of the torsion spring, the pivotable latch element will be shiftable into the end position last described, if the manual selector lever is not in the parking position. Under these circumstances, the selection of the parking position would be blocked by the said fork arm of the counterdetent member.

In the interlock device according to the invention, this danger is avoided by providing a control cam on the manual selector lever and a corresponding counter control cam on the second pivotable latch element, in such a way that engagement of these cams in a selection position of the manual selector lever which does not correspond to the parking position, prevents an actuation of the counterdetent cam of the slide (by the adjusting linkage) into a position not located in the path of movement of the first detent cam of the camshaft part.

It is also advantageous if the frame-shaped slide is displaceably mounted on an end face of a cylindrical switch housing, mounted fixably in terms of movement in the ignition-lock housing and adjacent to the lock-cylinder core. The camshaft part can have a hub which is central relative to the axis of rotation of the ignition lock and which is fixed in terms of rotation on an end of a controller which is mounted rotatably in the switch housing and projects therefrom. The camshaft part can be connected to the lock-cylinder core by means of a plug coupling. Also the camshaft part can consist of plastic and be reinforced with a metal driving plate on its end face confronting the lock-cylinder core.

Other objects, advantages and novel features of the present invention will become apparent from the following detailed description of the invention when considered in conjunction with the accompanying drawings.

BRIEF DESCRIPTION OF THE DRAWINGS

FIG. 4 shows a detailed partial longitudinal section, about the axis of rotation of the ignition lock of the interlock device of FIG. 1.

FIG. 5 shows an end view of the ignition lock of the interlock device of FIG. 1 taken in the direction of the arrow V of FIG. 4, with the lock cylinder removed, FIG. 6 shows a view of the ignition lock of the interlock device of FIG. 1 taken in the direction of the arrow VI of FIG. 4, in which the lock cylinder is merely indicated by dot-dash lines, and FIG. 7 shows a cross-section through the ignition lock of the interlock device of FIG. 1 along the line VII—VII of FIG. 6.

DETAILED DESCRIPTION OF THE DRAWINGS

Figure 1:
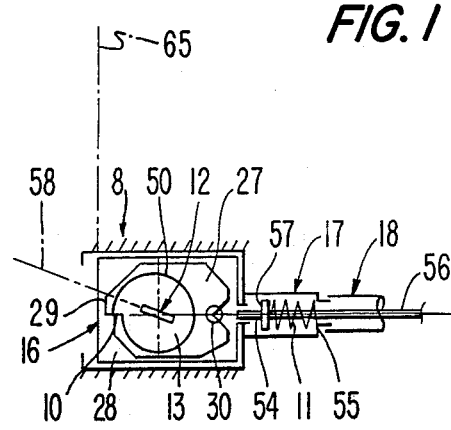
FIG. 1 shown a diagrammatic representation of the kinematic inter relationships of the interlock device when a manual gear selector lever is in the neutral position.
Figure 1:
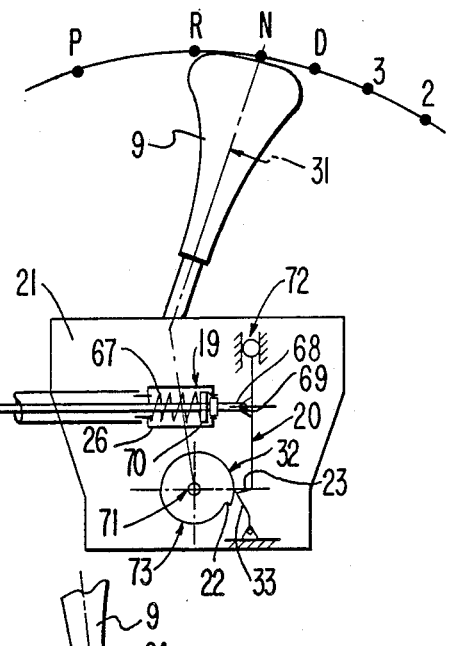

FIG. 4 shows a switch housing 15 fixedly mounted in terms of movement in the wide housing portion of an essentially stepped diameter cylindrical ignition-lock housing 14 of an ignition lock 8. A controller 37 is rotatably mounted in the housing 14. One end 36 of the controller 37 projects from an end face 35 of the switch housing 15, confronting the narrow housing portion of the ignition-lock housing 14 and is fixably connected (in terms of movement) to a hub 63, which is located central relative to the axis of rotation 12—12 of the ignition lock 8. The hub has a sleeve-shaped camshaft part 13.

A lock cylinder 40 (indicated by dot-dash lines) is fixedly mounted in terms of movement in the narrow housing portion of the ignition-lock housing 14. A lock-cylinder core 34 is mounted centrally and rotatable relative to the axis of rotation 12—12. The ignition lock 8 is actuable by means of an ignition key in a key channel 45 in the usual way.

Controller 37 and camshaft part 13 pass through a stepped diameter orifice 27 of a frame-shaped slide 28 of a latch element 16. Latch element 16 is slidably guided in two parallel guide slots 47 in the end face 35 of the plastic switch housing 15 by sliding shoe 46. The guide slots 47 are symmetrical in relation to a housing plane 49—49 that extends through the axis of rotation 12—12 of the ignition-lock housing 14.

The latch element 16 possesses a radially inner portion 48 for fixing the latch element in the direction of the axis of rotation 12—12. This portion 48 engages (with play) the end face 35 of the switch housing 15 on the one hand and the camshaft part 13 on the other hand.

The camshaft part 13 is equipped with a detent cam 10 and with a control cam 50 on its outer circumference.

In a corresponding way, the slide 28 has a counterdetent cam 29 and a counter control cam 30 which are provided at points of the orifice 27 located opposite one another in the housing plane 49—49. These detent and counter control cams interact with detent cam 10 and with the control cam 50 respectively.

The ignition-lock housing 14 has a connection piece 51 with a passage orifice 52 for passage of a flexible adjusting linkage 18 (FIGS. 1 to 3) for the transmission of both tensile and compressive forces to the lock. The axis 64—64 of passage orifice 52 is both in the housing plane 49—49 and perpendicular relative to the axis of rotation 12—12. A tappet 54 displacably passes through orifice 52 for actuating the latch element 16 and forms one rod end of a central actuating rod 56 of the adjusting linkage 18 itself, or is connected to this rod end in alignment and fixedly in terms of movement.

The adjusting linkage 18, at its rod end 17 belonging to the tappet 54, has a connector 55 which is coupled to the connection piece 51. A cylindrical compression spring 11, supported at one spring end on the housing and at its other spring end on a collar 57 of the rod end of the actuating rod 56, actuates the tappet 54 in the direction of the slide 28 of the latch element 16.

The camshaft part 13 is coupled to the lock-cylinder core 34 by means of a two part plug coupling 38. One coupling half being formed by two axial cuboid coupling drivers 59 and 60 (FIG. 5) of the camshaft part 13. The other part being two corresponding axial cuboid coupling drivers 53 of the lock-cylinder core 34 which engage positively, and therefore fixedly in terms of rotation, with the former coupling drivers and internally thereof. The last-mentioned coupling drivers 53 are made in one piece with the metal lock-cylinder core. The coupling drivers 59 and 60 are made of plastic and are reinforced by a metal driving plate 39 attached by a press fit onto the camshaft part 13.

The latch element 16 is actuable, on the one hand, by the control cam 50 of the camshaft part 13 into the end position 65 (shown in FIGS. 1, 3 and 7) in which the counterdetent cam 29 of the slide 28 is located in the path of movement 62 of the detent cam 10, and, on the other hand, by the tappet 54 into the end position 66 (shown in FIG. 2) in which the counterdetent cam 29 is not located in the path of movement 62 of the detent cam 10.

The lock-cylinder core 34 and the camshaft part 13 are actuable together by means of the ignition key into a position of rest 25 (FIG. 2) where the ignition key can be removed. The detent cam 10 of the camshaft part 13 is offset relative to the counterdetent cam 29 by the amount of a differential angle of rotation 42 (rotary angle position 43 of FIG. 2).

The lock-cylinder core 34 and camshaft part 13 are actuable by means of the ignition key into a driving position 44 (FIG. 3) in which the slide 28 is actuated into the end position 65 as a result of the engagement of the control cam 50 (rotary angle position 61) and counter control cam 30.

When the slide 28 is in the end position 65 (FIG. 1) during the actuation of the lock-cylinder core 34 by means of the ignition key, the camshaft part 13 moves in the direction of the position of rest 25 into a detent position 58, in which further actuation is blocked because the detent cam 10 comes up against the counterdetent cam 29.

A manual selector lever 9 of an automatic gearchange transmission is conventionally mounted so as to be pivotable about a pivot axis 71 on a housing part 21 fixed to the vehicle and located near the driver's seat. The lever 9 is actuable into individual selection positions, e.g. a parking position 24 (FIGS. 2 and 3) and a neutral position 31 (FIG. 1). A further latch element 20 is pivotally suspended on a bearing arrangement 72, fastened to the housing part 21 in the vicinity of the manual selector lever 9. End 68 of the actuating rod 56 of the adjusting linkage 18 is articulated by means of a knuckle joint 69. At linkage end 19, the adjusting linkage 18 possesses an endpiece 67 through which the rod end 68 passes displacably and which is fastened to the housing part 21 and receives a cylindrical compression spring 26. The compression spring 26, which is designed with a lower spring force than the compression spring 11, is supported on the housing 21 at one end and at its other end is supported on a collar 70 of the actuating rod 56. The latch element 20 is actuated by the respective spring force in the counter clockwise pivoting direction [going away from the pivot axis 71].

A cam disc 73 is rotatably arranged about the pivot axis 71 and is connected firmly to the manual selector lever 9. Cam disc 73 is equipped with a detent cam 22 and with a control cam 32. The pivotable latch element 20 is equipped with a counter detent cam 23 and a counter control cam 33.

The strong compression spring 11 seeks to keep the latch element 20 and the cam disc 73 bearing on one another. The mutual relationship between the cams of the manual selector lever 9 and the cams of the latch element 20 is such that the control cams 32 and counter control cams 33 are in mutual engagement in all positions of the manual selector lever 9, with the exception of the parking position 24. This results in the spring force of the compression spring 11 being absorbed by the control cam 32 via the adjusting linkage 18 and the collar 27. The tappet 54 is retracted into the position associated with the end position 65 of the slide 28. Only in the parking position 24 of the manual selector lever 9 can the detent cam 22 and the counterdetent cam 23 be brought into mutual engagement (when the ignition lock 8 is actuated into the position of rest 25, FIG. 2) or be brought out of engagement (when the ignition lock 8 is actuated out of the position of rest 25 in the direction of the driving position 44, FIG. 3).

MODE OF OPERATION

Figure 2:
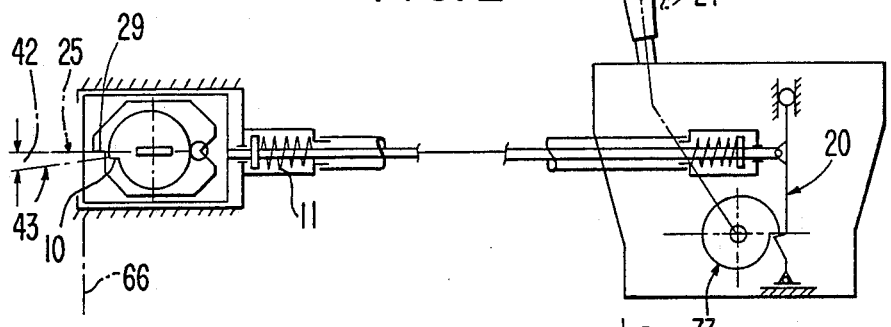
FIG. 2 shows a diagrammatic representation of the interlock device of FIG. 1, with the manual gear selector lever in the parking position.
Figure 3:
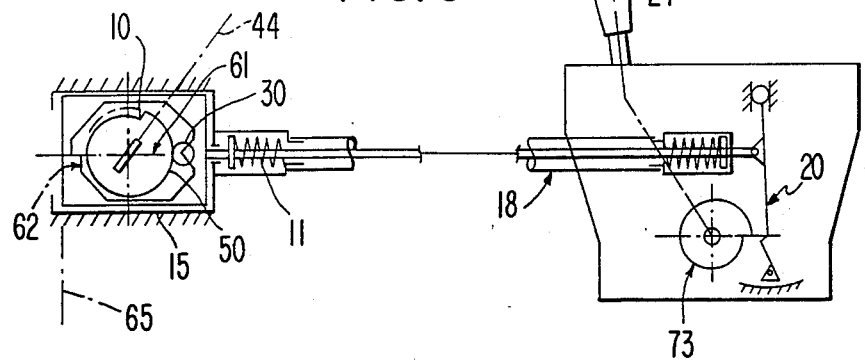
FIG. 3 shows a diagrammatic representation of the interlock device of FIG. 1, with the ignition lock actuated into a driving position by turning of the ignition key.

When the vehicle engine is switched off and the ignition key removed, the interlock device is in the position of FIG. 2 in which the manual selector lever 9 is locked in the parking position 24 by means of the latch element 20 and the cam disc 73.

When the engine is started, the ignition lock 8 is actuated in the direction of the driving position 44. Starting from the interlock position of FIG. 2, the control cam 50 of the camshaft part 13 acutates the slide 28 into the end position 65, with the result that the adjusting linkage 18 first actuates the latch element 20 into a release position (FIG. 3) relative to the cam disc 73 and in which the manual selector lever 9 is freed in order to be actuated into one of the other selection positions.

Before the engine is switched off, the interlock device is initially in the position of FIG. 1, in which the manual selector lever 9 is not yet in its parking position 24 and it is therefore impossible to remove the ignition key because the position of rest 25 is blocked as a result of the engagement of the detent cam 10 and counterdetent cam 29.

By selecting the parking position 24, the control cam 32 and counter control cam 33 come out of engagement with the manual selector lever, thereby freeing the compression spring 11 and actuating the slide 28 into the end position 66, in which the counterdetent cam 29 is no longer in the path of movement 62 (circular path about the axis of rotation 12—12) of the detent cam 10, and therefore the ignition lock 8 is actuable into the position of rest 25.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. An interlock device between an ignition key lock and a manual selector lever of an automatic gear change transmission; comprising;

a first detent cam on a camshaft part which is rotatable by an ignition key about an axis and counter to a first resilient means;

the camshaft part is mounted in alignment with and rotatable relative to an axis of rotation of the ignition key lock;

the detent cam interacts with a first latch element which is displacably arranged on a housing part, fixed in terms of movement relative to an ignition key lock housing;

the first latch element is connected kinematically to a rod end of a mechanical adjusting linkage;

another end of the mechanical linkage is connected kinematically to a further latch element pivotably mounted on a housing part fixed to the vehicle, in the vicinity of the manual selector lever;

the further latch element interacts with a second detent cam;

the second detent cam is moveable by the manual selector lever through a counterdetent means;

wherein when the manual selector lever is actuable into a parking position, the ignition key lock is moved into a set rotary angle position wherein an ignition key can be inserted and withdrawn from the ignition key lock and wherein a mutual relationship of the two detent cams and latch elements is such that only in the parking position of the manual selector lever can the ignition lock be brought into said one set rotary angle position and wherein the manual selector lever is necessarily locked in its parking position;

wherein the second detent cam of the manual selector lever is uncoupled from the counterdetent means of the further pivotable latch element when the manual selector lever is not in the parking position;

wherein second resilient means, supported relative to the housing part, act with an uncoupling effect to disengage the second pivotable latch element from the second detent cam;

wherein the camshaft part has its axis of rotation aligned with an orifice of a frame-shaped slide of the first displacable latch element;

wherein an additional control cam on the camshaft part can be brought into engagement with a counter control cam on the frame-shaped slide by operation of the first detent cam contacting a counterdetent cam on the frame-shape slide;

wherein the counterdetent cam and counter control cam are arranged radially relative to the axis of rotation of the camshaft part and at points on the slide that are located diammetrically opposite one another in relation to the camshaft part;

wherein the counterdetent cam is located at a angle of rotation in front of a rotary angle position corresponding to the one set rotary angle position of rest;

wherein the counter detent cam can be brought out of engagement with the detent cam of the camshaft part by the resilient means counteracting the actuation by the ignition key;

wherein the resilient means, counteracting the actuation of the ignition key, is designed with a higher spring force than the second resilient means acting on the second pivotable latch element to disengage the second latch element from the second detent cam of the manual selector lever; and wherein during actuation of the ignition key of the ignition key lock into a rotary angle position corresponding to a driving position of the ignition key lock, the additional control cam of the camshaft part comes into engagement with the counter control cam on the frame-shape slide such that the counterdetent cam of the slide is located in the path of movement of the first detent cam of the camshaft part and the second pivotable latch element is uncoupled from the second detent cam of the manual selector lever.

2. Interlock device according to claim 1, wherein a second control cam is coupled to the manual selector lever and a corresponding counter control cam is provided on the second pivotable latch element;

wherein when the second control cam is in engagement with the corresponding counter control cam in a selection position of the manual selector lever which does not correspond to the parking position; and wherein such an engagement prevents an actuation of the counterdetent cam of the slide by the adjusting linkage into a position not located in the path of movement of the first detent cam of the camshaft part.

3. Interlock device according to claim 1, wherein the frame-shaped slide is displacably mounted on an end face of a cylindrical switch housing fixably mounted in terms of movement in the ignition-lock housing and adjacent to a lock-cylinder core.

4. Interlock device according to claim 2, wherein the frame-shaped slide is displacably mounted on an end face of a cylindrical switch housing fixably mounted in terms of movement in the ignition-lock housing and adjacent to a lock-cylinder core.

5. Interlock device according to claim 1, wherein the camshaft part has a hub which is located centrally relative to the axis of rotation of the ignition lock and which is fixed in terms of rotation on an end of a controller projecting from and mounted rotatably in the switch housing.

6. Interlock device according to claim 2, wherein the camshaft part has a hub which is located centrally relative to the axis of rotation of the ignition lock and which is fixed in terms of rotation on an end of a controller projecting from and mounted rotatably in the switch housing.

7. Interlock device according to claim 3, wherein the camshaft part has a hub which is located centrally relative to the axis of rotation of the ignition lock and which is fixed in terms of rotation on an end of a controller projecting from and mounted rotatably in the switch housing.

8. Interlock device according to claim 4, wherein the camshaft part has a hub which is located centrally relative to the axis of rotation of the ignition lock and which is fixed in terms of rotation on an end of a controller projecting from and mounted rotatably in the switch housing.

9. Interlock device according to claim 1, wherein the camshaft part is connected to the lock-cylinder core by means of a plug coupling.

10. Interlock device according to claim 2, wherein the camshaft part is connected to the lock-cylinder core by means of a plug coupling.

11. Interlock device according to claim 3, wherein the camshaft part is connected to the lock-cylinder core by means of a plug coupling.

12. Interlock device according to claim 4, wherein the camshaft part is connected to the lock-cylinder core by means of a plug coupling.

13. Interlock device according to claim 5, wherein the camshaft part is connected to the lock-cylinder core by means of a plug coupling.

14. Interlock device according to claim 6, wherein the camshaft part is connected to the lock-cylinder core by means of a plug coupling.

15. Interlock device according to claim 7, wherein the camshaft part is connected to the lock-cylinder core by means of a plug coupling.

16. Interlock device according to claim 8, wherein the camshaft part is connected to the lock-cylinder core by means of a plug coupling.

17. Interlock device according to claim 9, wherein the camshaft part is plastic and is reinforced with a metal driving plate on an end face confronting the lock-cylinder core.

18. Interlock device according to claim 10, wherein the camshaft part is plastic and is reinforced with a metal driving plate on an end face confronting the lock-cylinder core.

19. Interlock device according to claim 11, wherein the camshaft part is plastic and is reinforced with a metal driving plate on an end face confronting the lock cylinder core.

20. Interlock device according to claim 12, wherein the camshaft part is plastic and is reinforced with a metal driving plate on an end face confronting the lock-cylinder core.

* * * * *